United States Patent
Levin et al.

(10) Patent No.: US 9,217,688 B2
(45) Date of Patent: Dec. 22, 2015

(54) FIBER OPTIC END FACE INSPECTION PROBE AND SYSTEM

(76) Inventors: Piotr Anatolij Levin, Vilnius (LT);
Igoris Dolznikovas, Vilnius (LT);
Valdas Kavaliauskis, Telsiai (LT);
Michail Kustov, Vilnius (LT)

(*) Notice: Subject to any disclaimer, the term of this patent is extended or adjusted under 35 U.S.C. 154(b) by 464 days.

(21) Appl. No.: 12/900,301

(22) Filed: Oct. 7, 2010

(65) Prior Publication Data

US 2011/0085159 A1 Apr. 14, 2011

Related U.S. Application Data

(60) Provisional application No. 61/278,543, filed on Oct. 8, 2009.

(51) Int. Cl.
*G01N 21/00* (2006.01)
*G01M 11/00* (2006.01)
*G01M 11/08* (2006.01)

(52) U.S. Cl.
CPC ............ *G01M 11/30* (2013.01); *G01M 11/088* (2013.01); *G01M 11/3154* (2013.01)

(58) Field of Classification Search
CPC .. H04B 10/071; H04B 10/07; H04B 10/2569; G01M 11/3109; G01M 11/3172; G01M 11/3181; G01M 11/319; G01M 11/085; G01N 21/412; G01N 21/952
USPC .................................... 356/73.1, 64, 430, 400
See application file for complete search history.

(56) References Cited

U.S. PATENT DOCUMENTS

| | | | | |
|---|---|---|---|---|
| 6,636,298 | B1 * | 10/2003 | Bachelder et al. | 356/73.1 |
| 8,998,939 | B2 * | 4/2015 | Price | A61B 17/00234 |
| | | | | 606/169 |
| 2007/0206952 | A1 * | 9/2007 | Hase et al. | 398/118 |
| 2011/0009694 | A1 * | 1/2011 | Schultz | A61B 1/00052 |
| | | | | 600/109 |

OTHER PUBLICATIONS http://www.aflglobal.com/Products/Test-and-Inspection/Fiber-Optic-Inspection/FOCIS-WiFi-Fiber-Optic-Connector-Inspection-System.aspx.*
http://myaccount.flukenetworks.com/fnet/en-us/supportAnd-Downloads/KB/Fiber-Testing/DTX-COMPACT-OTDR/Launch+and+Receive+Fibers+-+DTX+Compact+OTDR+Module.*

* cited by examiner

*Primary Examiner* — Tarifur Chowdhury
*Assistant Examiner* — Mohamed K Amara
(74) *Attorney, Agent, or Firm* — Michael J. Persson; Catherine E. Napjus; Lawson Persson & Weldon-Francke

(57) ABSTRACT

A fiber optic end face inspection probe that includes a power control, an image control; a probe adaptor and probe end extending from a housing; an electronics module that includes a microprocessor, a memory and an optional wireless transmitter; and an autofocus camera system that includes a lens, a motor adapted to move the lens in order to focus the image through the lens, and an image sensor that is adapted to accept the image passing through the lens and transmit this image to the electronics module.

14 Claims, 8 Drawing Sheets

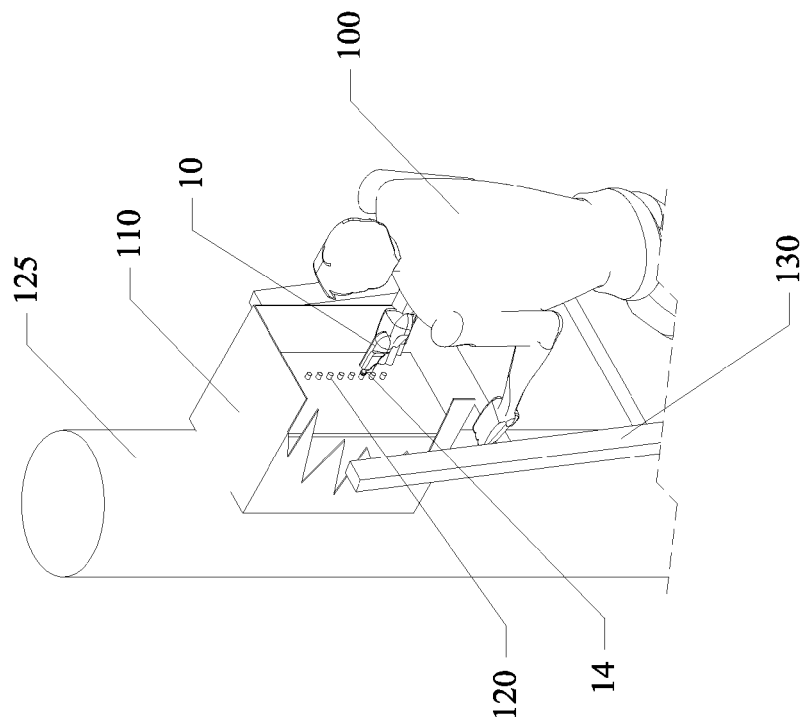
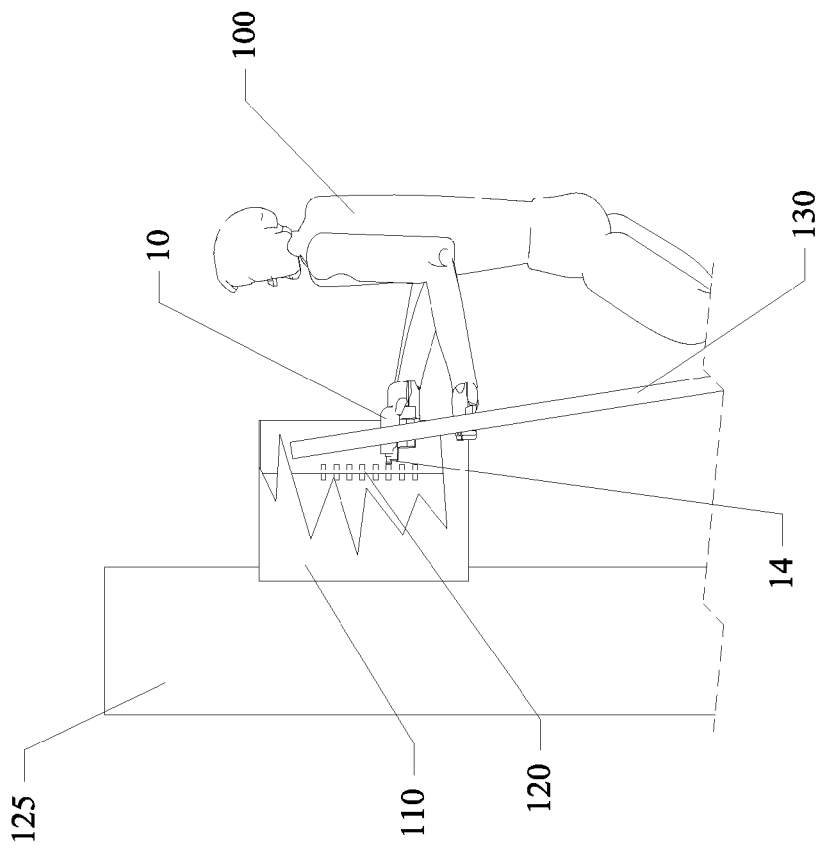

FIBER OPTIC END FACE INSPECTION PROBE AND SYSTEM

CLAIM OF PRIORITY

This application claims the benefit of priority of U.S. Provisional Patent Application Ser. No. 61/278,543, filed on Oct. 8, 2009.

FIELD OF THE INVENTION

The present invention relates to systems for inspecting fiber optic end faces, and in particular to an improved handheld probe for fiber optic connector end face inspection.

BACKGROUND OF THE INVENTION

The present invention pertains to the inspection of the end faces of optical fibers. Contamination of fiber optic end faces is the cause of a significant number of fiber optic system failures. A single contaminant particle on the end face of an optical fiber can cause significant back reflection, insertion loss, and equipment damage. Visual fiber optic end face inspection is the only way to determine if the end faces of optical fibers are clean, and is essential to reliable functionality.

There are many products in the art of visual fiber optic end face inspection. Most of these products are video inspection probes that include an inspection probe connected to a handheld viewing device via a cable. The inspection probe captures video of the fiber optic connector end face, which is transmitted to the handheld viewing device through the cable and displayed on a screen for viewing the video transmitted by the inspection probe. The operator applies the inspection probe to the fiber optic end face and, while viewing the screen, manually focuses the video on the fiber optic end face. The operator may then assess the video image to determine the condition of the fiber optic end face. In one variation within the art, some inspection probes use video to locate the fiber optic end face. The operator then manually focuses the video on the fiber optic end face and then captures a still image of the fiber optic end face once it is located and manually focused upon. From there, the operator may assess the still image from the handheld viewing device, as described above. In addition, there are software products on the market that may be used in conjunction with the handheld viewing device that may make the assessment automatically. All prior art fiber optic end face inspection products, as discussed above, require manual focusing, even in the last example where the assessment is automatic but not the focusing.

Although capable of performing the necessary task, conventional video inspection probes have significant disadvantages. The ergonomics of using the video inspection probe, for example, are neither efficient nor safe. The available products all depend on operator skill and precision in focusing on the fiber optic end face. This requires the use of at least one of the operator's hands for focusing, as well as the time necessary to focus. Moreover, all of these products include the inspection probe tethered in some manner to the handheld viewing device. Thus, the operator needs to bring the handheld viewing device with him for any inspections, in addition to the inspection probe. When the connector housing the fiber optic end face to be inspected is positioned such that its inspection requires use of a ladder, or is otherwise difficult to reach, the user may be put into an awkward and/or unsafe position. This is illustrated with reference to FIGS. 6A and 6B, which show a user on a ladder using a conventional video inspection probe. For personal safety reasons, the user will usually need to use one hand to secure his position. He also must use one hand to hold the inspection probe. He also needs to hold the handheld viewing device. He may be able to hold it in the same hand that is securing his position, but this could jeopardize his grip, and, therefore, his safety. Even if he is able to affix the handheld viewing device to his person, relieving the need to hold it in his hand, the viewing device is still tethered to the inspection probe. Should the tether be too short, he may have to position himself awkwardly and unsafely to reduce the distance between the two devices. Alternatively, he may have to stretch the tether, risking damage to the devices and the possibility that the surprise of a break would unseat him. Should the tether be too long, he risks entangling himself, the devices, and other objects around him, again posing a risk to his safety. In summary, the need to juggle both the handheld viewing device and the inspection probe, tethered together, and to ensure his own safety, present a risk to the user's safety as well as a risk of damage to the inspection probe, the handheld viewing device, or both, which would require costly repairs or replacement.

These systems also require that the data be analyzed on the small screen of the handheld viewing device; a device which may have limited functionality beyond basic viewing and analysis capabilities. In addition, the total portable video inspection probe system, including the inspection probe with video capabilities and the handheld viewing device with viewing screen, requires significant battery power that needs frequent recharging. Finally, when the user plugs the probe into the connector or adaptor within which the fiber optic end face to be tested is disposed, he needs to keep the probe aligned with the fiber optic end face within each connector or adaptor and rotate a focusing wheel at the same time. As a result, the user continuously shakes the probe, which makes the focusing task difficult to perform and greatly increases the time that it takes to check the fiber optic end face within each connector.

One possible solution to the problems inherent in conventional video inspection probes would be to wirelessly transmit the image data from the inspection probe to the viewing device. However, this option has not been implemented for a number of reasons. First, video streaming via wireless transmission is limited by the speed at which the screen may be refreshed. Thus, images are often blurry and the operator may have difficulty determining exactly when the video probe has been correctly placed and is focused. Moreover, the power necessary to continuously transmit video wirelessly would be significant, requiring a bulky battery and/or frequent battery charging.

Therefore, there is a need for a fiber optic end face inspection probe that does not have these disadvantages. Specifically, there is a need for an inspection probe that does not require manual focusing; that is not tethered to another piece of equipment; that will not use significant power; that may be used in conjunction with viewing devices other than handheld viewing devices; and that may quickly transmit images of the fiber optic end faces to different devices.

SUMMARY OF THE INVENTION

The present invention is a fiber optic inspection probe for inspecting end faces of optical fibers and a system utilizing the inspection probe. In some embodiments, the inspection probe includes a housing, a power control and an image control disposed through the housing, and a probe end and probe adaptor extending from the housing. In such embodiments, the power control and image control are in electrical communication with a battery and an electronics module that includes a controller, a microprocessor, a memory, and preferably a wireless transmitter that may be a transceiver. However, the power control and image control may be eliminated and their functions may be performed wirelessly. An autofocus camera system includes a lens, a means for focusing the image, and an image sensor, such as a complementary metal oxide semiconductor (CMOS) camera or charge coupled device (CCD), that is adapted to accept the image passing through the lens and transmit this image to the electronics module.

In some embodiments, the lens is a conventional glass or plastic lens and the means for focusing the image is a motor adapted to move the lens in order to focus the image. In such embodiments, both the lens and motor are preferably disposed within the probe end so as to allow disposition of the lens as close to the probe adaptor as possible, for necessary magnification of the fiber optic end face. In other embodiments, the lens is a liquid lens and the means for focusing the image is a variable voltage source that is in electrical communication with the lens and is adapted to the apply a controlled voltage to a conductive liquid within the lens in order to focus the lens. In some embodiments, a lens may be included at the tip of a probe adaptor and a fixed lens may also be disposed within the probe end. These lenses at the tip of the probe adaptor and fixed within the probe end may be to the exclusion of a lens within the autofocus camera system.

Regardless of the type of lens that is used, the electronics module preferably includes autofocus software that automatically analyzes the image captured by the image sensor and controls the means for focusing the image through the lens. The controller and/or processor write a sharp still image to memory and may transmit the image wirelessly. In some embodiments, the controller and/or processor also display the image on an integral viewing screen, such as a liquid crystal display (LCD), OLED, electroluminescent display, or other known type of display screen. The probe may also indicate test results by a visual or sound indicator. Transmission software also may be stored within the memory of the electronics module to automatically transmit captured images using the wireless transmitter.

In operation, a user will insert the probe adaptor affixed to the probe end into a fiber optic connector or mating adaptor such that the probe adaptor is aligned with the end face of an optical fiber that terminates within the connector or mating adaptor. The user will then depress the image control to capture an image. The depression of the image control causes the preferred inspection probe to automatically focus on the end face of the optical fiber to be tested, capture a focused image, save it into internal memory and, in some embodiments, wirelessly transmit this focused image to a remote device.

As the preferred inspection probe needs power only to turn on, autofocus on the fiber optic end face, capture one focused still image of the fiber optic end face, write to memory and, in some embodiments, wirelessly transmit the image to another device, the device uses very little power and will need only infrequent battery charging. Further, because the user does not need to focus the image manually, the user may concentrate on ensuring that the probe adaptor is properly inserted into the fiber optic connector or mating adaptor. Finally, the wireless transmission of the image data eliminates the cumbersome tethered arrangement that is inherent in prior art inspection probes. The autofocus feature, in particular, is a great advancement over prior art, as the current state of the art requires a great deal of time and fumbling to get an image, many of which will still be unfocused and require retaking despite this effort.

The preferred embodiment of the inspection probe includes a Bluetooth transceiver, which both transmits and receives signals wirelessly, but in some embodiments the inspection probe may include a transmitter only.

The preferred embodiment of the inspection probe does not include an integral display. However, some embodiments of the inspection probe may include an integral display, which may depict the captured image of the fiber optic end face. In an embodiment with or without the screen, the inspection probe may also include software that may automatically assess the captured image of the fiber optic end face and display the results. If such software is included in the probe, the results may be displayed by any means commonly known in the art, such as the inclusion of green and red light emitting diodes (LEDs) that may light or flash green for a "pass" result and red for a "fail" result. Other means may be aural, such as a short click or beep indicating a "pass" and a long click or beep indicating a "fail." In the embodiment that includes a screen, results may be displayed on the screen, for example highlighting defects like scratches or contaminations. One of ordinary skill in the art will appreciate that these are but a few of many options commonly used in the art for indicating results and other information.

In some embodiments, the system for fiber optic end face inspection of the present invention includes the fiber optic end face inspection probe, with or without an integrated visual or sound indicator, and an external device. The external device may be a viewing device, such as a handheld viewing device of a kind similar to those commonly used in the art of fiber inspection, PCs, notebooks, palm computers, cell phones or workstations. In embodiments where the external device is a remote viewing device, the remote viewing device is any viewing device that may be used in combination with a fiber optic end face inspection probe for the assessment of fiber optic end faces, and is at some distance away from the fiber optic end face inspection probe. In some such embodiments, the remote viewing device includes a wireless transceiver, such as a Bluetooth transceiver, that allows the remote viewing device to send information back to the fiber optic end face inspection probe. In embodiments of the system that include a remote viewing device and a wireless transceiver, it is preferred that the remote viewing device also includes software that automatically analyzes the captured image of the fiber optic end face and transmits a signal corresponding to the results of this analysis to the inspection probe. In still other embodiments, the remote viewing device includes a wireless receiver, which allows the device to receive data wirelessly from the probe but does not wirelessly transmit data back to the probe.

In some embodiments, the external device may be other test equipment, such as OTDR's, that include storage, external hard drives, or the like, which store the image files for later retrieval. In embodiments in which the probe is adapted to download images to an external device for storage, the image files may be downloaded wirelessly or via a known interface, such as a USB, RS232, RS4, GPIB, Firewire, to the external device.

In an alternative embodiment of the system, the inspection probe itself includes the software necessary to analyze a captured image, determine whether the fiber optic end face passes or fails the test, and provide an indication of the result of the test to the user. In such embodiments, the user will simply capture an image in the manner described above and receive an indication of whether the fiber optic end face passed or failed the inspection.

Finally, in some embodiments of the invention that include an integral viewing screen to display the image, the probe includes means for manually focusing the image that allows the user to override the autofocus software. The ability to manually focus the image is useful in situations where the autofocus does not provide a clear or desired image. In still other such embodiments, the autofocus software is eliminated and the camera is a manually focused camera. As noted above, such an embodiment is not preferred due to the advantages inherent in the ability of the probe to automatically focus the image.

It is therefore an aspect of the present invention to provide a fiber optic end face inspection probe that is capable of autofocusing on the fiber optic end face to be inspected.

It is another aspect of the present invention to provide a fiber optic end face inspection probe that is not physically tethered to another device, such as a handheld viewing device.

It is another aspect of the present invention to provide a fiber optic end face inspection probe with the capability to wirelessly transmit an image to another device at some distance away from the fiber optic end face inspection probe.

It is another aspect of the present invention to provide a fiber optic end face inspection probe that operates quickly and easily using a single hand.

It is another aspect of the present invention to provide a fiber optic end face inspection probe that uses relatively little power.

It is another aspect of the present invention to provide a system for fiber optic end face inspection wherein the operator need bring only one small piece of equipment with him to the inspection site.

It is another aspect of the present invention to provide a system for fiber optic end face inspection that includes a viewing device that may have a larger screen and more analysis capabilities than a handheld viewing device.

It is another aspect of the present invention to provide a system for fiber optic connector end face inspection that includes an integrated indicator device, either visual or audible, onboard and does not require the use of any external equipment.

These aspects of the invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIGS. 4A and 4B are views of an operator using the fiber optic end face inspection probe of the present invention.

DETAILED DESCRIPTION OF THE INVENTION

The fiber optic end face inspection probe of the present invention includes many of the same features as those commonly used in the art of fiber optic end face inspection probes. Examples of such fiber optic end face inspection probes include the JDSU FBP-P1 Video Inspection Probe, the AFL Telecommunications Noyes® VFS2 View Safe Video Microscope, and the EXFO FIP-400 Fiber Inspection Probe. These fiber optic end face inspection probes are handheld devices that may be applied to a fiber optic end face to be inspected for imperfections. The principal difference between the fiber optic end face inspection probe of the present invention and fiber optic end face inspection probes commonly used in the art is that prior art probes use video, which must be manually focused to assess the condition of the fiber optic end face. Further, because of the power requirements inherent in video based devices, these probes have heretofore been tethered to a separate viewing device that houses a large battery. Conversely, the fiber optic end face inspection probe of the present invention includes an autofocus feature, microprocessor and, preferably, a wireless transmitter, which eliminate the use of both the tether cord and the separate viewing device required in current manually focused video inspection probes.

Figure 1:
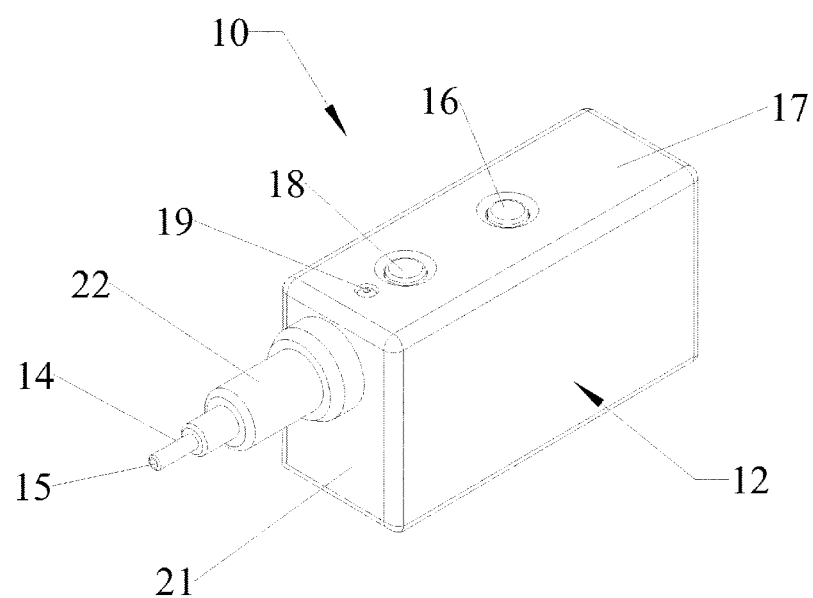
FIG. 1 is an isometric view of a preferred embodiment of the fiber optic end face inspection probe of the present invention.
Figure 2A:
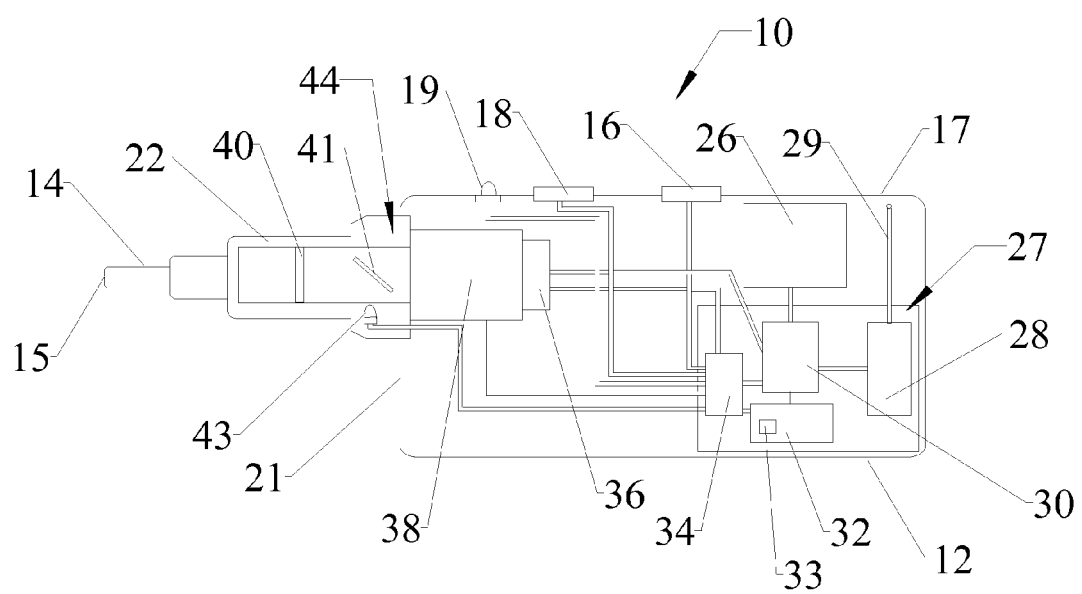
FIG. 2A is cross-sectional view of the interior components of the preferred fiber optic end face inspection probe of FIG. 1 utilizing a motor focused lens.
Figure 2B:
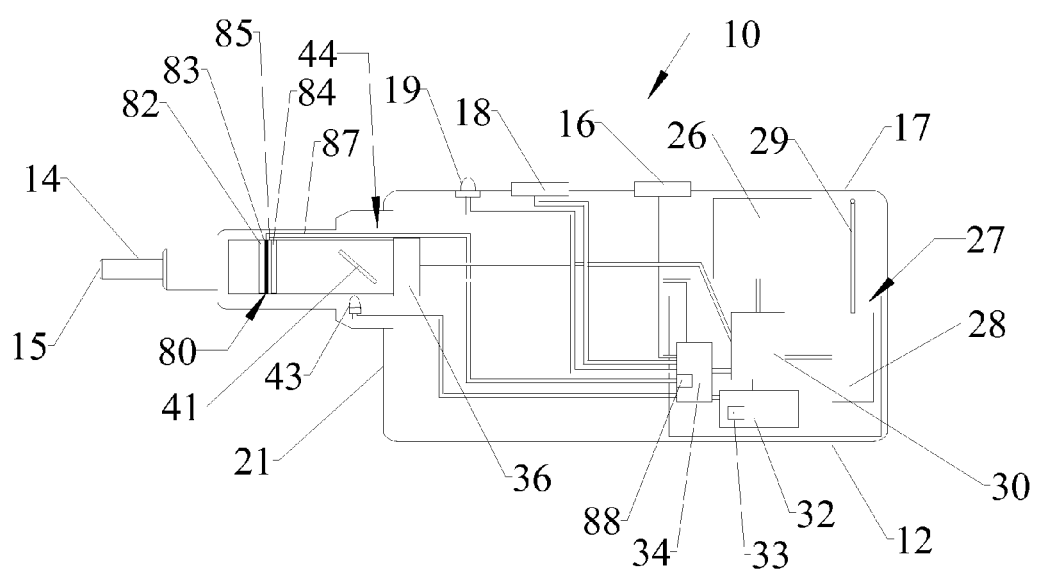
FIG. 2B is cross-sectional view of the interior components of the preferred fiber optic end face inspection probe of FIG. 1 utilizing a liquid lens.

Referring first to FIGS. 1, 2A and 2B, a preferred embodiment of the fiber optic end face inspection probe 10 of the present invention is shown. The inspection probe 10 includes a probe end 22 integrally attached to the front 21 of housing 12. Controls 16 and 18, and an indicator light 19 are preferably disposed upon housing 12. Housing 12 is substantially hollow, is preferably manufactured of a plastic material, and is dimensioned to easily fit within the palm of the hand of an average sized adult.

Probe adaptor 14 is preferably removably attached to the front 21 of the housing 12 via probe end 22 and is dimensioned to mate with a specific fiber optic connector within which the fiber optic end face to be inspected is disposed. Probe adaptor 14 includes a substantially hollow or optically transparent end 15 through which light may pass from the fiber optic end face and through the lens 40. Lens 40 may be focused as discussed below with reference to the camera system 44, and may be disposed within probe end 22 directly proximate to probe adaptor 14, ensuring necessary magnification. In some embodiments, probe adaptor 14 may include another lens affixed proximate to its end 15, in addition to lens 40. In some embodiments, probe end 22 may also include another fixed lens, in addition to lens 40. In some embodiments, camera system 44 does not include lens 40, and lens 40 is substituted by a lens within probe adaptor 14 and/or within probe end 22. Probe end 22 is dimensioned to secure the probe adaptor 14 to the housing 12. A beamsplitter 41 is preferably disposed within probe end 22. The beamsplitter 41 redirects light originating from light module 43 such that the light travels through probe adaptor 14 to illuminate fiber optic end faces to be tested. It is noted that the probe adaptor 14 shown in FIGS. 1, 2A and 2B are dimensioned for use with a standard SC type bulkhead connector, but will take different forms depending upon the configuration of the mating connector. For example, a probe adaptor 14 for an ST type bulkhead connector will have a different configuration, as would a probe adaptor 14 for a patch cord, or male connector. Accordingly, the probe adaptor 14 should not be seen as being limited to any specific configuration.

The inspection probe 10 of FIGS. 1, 2A and 2B includes two controls 16 and 18, which are preferably disposed through the top 17 of the housing 12. In the embodiment of FIGS. 1, 2A and 2B, power control 16 is in communication with the electronics module 27 and is used to turn the inspection probe 10 on and off. Image control 18 is also in communication with the electronics module 27 and controls the operation of the inspection probe 10. Pressing the image control 18 sends a signal to the electronics module 27 to capture an image in the manner described below. It is noted that the preferred power control 16 and image control 18 are button type controls that are commonly used in the fiber test equipment industry. However, other art recognized controls may be utilized and the controls 16, 18 should not be seen as being limited to the buttons shown in FIGS. 1, 2A and 2B. Further, in some embodiments, the power control 16 is eliminated and the image control 18 is used both to power on the inspection probe 10 and to instruct the electronics module 27 to capture an image. In other embodiments, such as the embodiment of FIG. 5, additional controls are included to perform functions, such as controlling a zoom or navigating through software menus displayed on an integral display. In still other embodiments, the inspection probe 10 does not have any integral controls and, rather, is controlled wirelessly using the wireless transceiver 28.

Indicator light 19 is preferably an LED that provides the user with an indication when the inspection probe 10 is turned on and when an image is captured. In the preferred embodiment, the indicator light 19 is a multicolored LED that will be illuminated in one color to indicate when the power is on, another color to indicate when an image is captured, and will blink when the battery 26 is low. In other embodiments, the indicator light 19 is a single color LED that is fully illuminated when the inspection probe 10 is turned on and blinks when an image is captured. Although a single indicator light 19 is shown in FIG. 1, it is recognized that some embodiments of the inspection probe 10 may include multiple indicator lights. In other embodiments there are no indicator lights 19 or sounds at all and all information is shown on an integrated display such as is shown and described with reference to FIG. 5. Other embodiments, such as that shown in FIG. 5, include both an indicator light 19 and an audible alarm (not shown) that makes sounds when the inspection probe 10 is turned on and when an image is captured, while still others include an audible alarm alone. The back (not shown) of inspection probe 10, which is opposite the front 21, preferably includes an external interface (not shown), such as a USB port, RS232 connector, GPIB connector, Firewire connector, or the like.

The interior of housing 12 includes a battery 26, the electronics module 27, a light module 43 and a camera system 44. Battery 26 may be any battery commonly used in connection with handheld fiber optic test equipment and is preferably a rechargeable battery that is relatively lightweight and of a size that provides sufficient battery life while not increasing the size of the housing 12 to a level where it may not easily fit within an average sized adult hand. However, the type of battery chosen will depend upon the amount of power consumed by the inspection probe 10. For example, in embodiments that consume very little power, it would be preferable to use standard non-rechargeable batteries and change them when required.

Light module 43 is preferably an LED that is used to light the fiber optic end face to be tested with continuous or pulsed light. As shown in FIG. 2, the light module 43 is disposed below beamsplitter 41 so as to be able to supply beamsplitter 41 with light that beamsplitter 41 may redirect through probe adaptor 14 and out the end 15 to illuminate the fiber optic end face being tested. Although light module 43 is depicted in FIG. 2 as described above, it is recognized that the light module 43 may be disposed in other locations, and may be of any type of light module recognized in the art, provided it is able to illuminate the fiber optic end face to be inspected.

The camera system 44 of FIG. 2A includes an image sensor 36, preferably an Omnivision OV3142 black and white CMOS image sensor, an autofocus motor 38, and a lens 40 that is disposed and movable within probe end 22. Motor 38 moves the lens 40 back and forth during autofocusing in order to find the best picture. The autofocus feature used by the camera system 44 is preferably a passive autofocus system, such as those commonly found in cellular telephone cameras. The passive autofocus system focuses the image through an analysis of the image itself. In operation, the camera system 44 produces a first image that is sent to the electronics module 27, which analyzes the image and directs the motor 38 to drive the lens 40 back and forth searching for the best focus.

The camera system 44 of FIG. 2B also includes an image sensor 36 but includes a liquid lens 80 that allows the motor 38 to be eliminated. Liquid lens 80 includes a first transparent plate 84 and a second transparent plate 84, and a first liquid 83 and a second liquid 85 disposed between the two plates 82, 84. The first liquid 83 is preferably water, although it can be any electrically conductive liquid, and the second liquid 85 is preferably oil, although any non-conductive liquid that will not mix with the first liquid 83 may be used. The inability of the first liquid 83 to mix with the second liquid 85 means no membrane is necessary between the two liquids 83, 85. A tiny, variable voltage is delivered to the first liquid 83, which causes it to change shape. A higher current pulls the first liquid 83 in upon itself, creating a concave effect and a lower voltage makes it rounder. There are no moving parts, and the second liquid 85, which must be of even density and temperature, helps keep the first liquid 83 in shape and in place. The voltage, which is typically low enough to be measured in milliwatts, is preferably provided by a small integrated circuit 88 that is part of the controller 34 and attaches to the lens 80 via wire 87. The voltage can be varied to give the lens 80 a broad focal range.

The analysis of the image involves an evaluation of the contrast of the actual image elements. Light from the fiber optic end face under test hits the image sensor 36. The image sensor 36 may perform only the basic function of image sensing, or may perform other commands, such as contrast calculation and frame and/or resolution setting. The image sensor 36 sends an image to the microprocessor 30. The microprocessor 30 then analyzes the values from each pixel to determine a difference in intensity among the adjacent pixels; adjacent pixels will have very similar intensities if the image is out of focus. If so, the microprocessor 30 then sends a signal directing refocusing of the lens 40, after which the image sensor 36 captures another image. This image is analyzed to see if the difference in intensity between adjacent pixels improved or got worse and the process is repeated until the microprocessor 30 determines that the image is at a point where there is maximum intensity difference between adjacent pixels, which is the point of best focus.

In general, the electronics module 27 includes a controller 34, a microprocessor 30, a memory 32 and a wireless transceiver 28 having an antenna 29. An external interface, preferably a USB port (not shown), on the back (not shown) of inspection probe 10 is preferably in communication with electronics module 27 such that it may transfer images taken by the camera system 44 to an external device, such as a viewing device, storage device, personal computer, or the like.

Controller 34 accepts inputs from the image control 18, microprocessor 30 and camera system 44 in order to control the operation of the inspection probe 10. In particular, the controller 34 receives commands wirelessly or from image control 18 and generates a command to the camera system 44 to start taking an image. At the same time, controller 34 generates a command to light module 43 to light the fiber optic end face to be tested with continuous or pulsed light. Microprocessor 30 then analyzes the image to determine whether it is in focus. Then controller 34 either activates the autofocus motor 38 of the camera system 44, which moves the camera lens 40, or directs the integrated circuit 88 to change the voltage supplied to the liquid lens 80, in order to refocus the image. Controller 34 then sends another command to the light module 43 to light the fiber optic end face to be tested and at the same time to the camera system 44 to take the next image. This process continues until the most sharply focused picture is captured. Then microprocessor 30 writes this image to memory and/or wirelessly sends it to the remote display. In some embodiments this image may be additionally processed by the microprocessor 30 to compress it into a smaller file format or to analyze if the fiber optic end face is good or faulty. In addition to the functions described above, in some embodiments, controller 34 sends special commands and settings to the image sensor 36.

It is recognized that the operator has many options as to how he handles the image once it has been produced. For example, he may store every image taken, or he may choose to discard certain images, such as those that indicate a clean fiber optic end face. He may also choose to only transmit certain images. He may store the images on the handheld device and immediately wirelessly send the images to a remote display or storage device, or he may load them onto another viewing device later. If the handheld inspection probe of the present invention that he is using includes a display on the inspection probe, he may view and analyze the images immediately, or store them to analyze later. These are but a few options that the operator has in regard to how he handles the image once produced. Although examples herein may present only a few of these options, it should be understood that the a full range of options is available to the operator.

Although controller 34 is shown as a single electronic device in FIG. 2, it is recognized that the functions of the controller 34 may be performed by multiple dedicated components. In such embodiments that include multiple dedicated components, each component would require its own memory and software. In addition, in the preferred embodiment, the controller 34, microprocessor 30 and memory 32 are integrated into a single digital signal processor, which performs all of the control functions of the inspection probe 10. Accordingly, the controller should not be seen as being limited to the controller 34 shown in FIG. 2.

The wireless transceiver 28 is preferably a Bluetooth transceiver, although any wireless connection may be utilized. Such a transceiver is preferred as it allows data to flow back and forth from the inspection probe 10 to the remote device, allowing the remote device both to receive image data and to wirelessly transmit information to the inspection probe 10 informing the user whether the fiber optic end face passed or failed the test.

Figure 7:
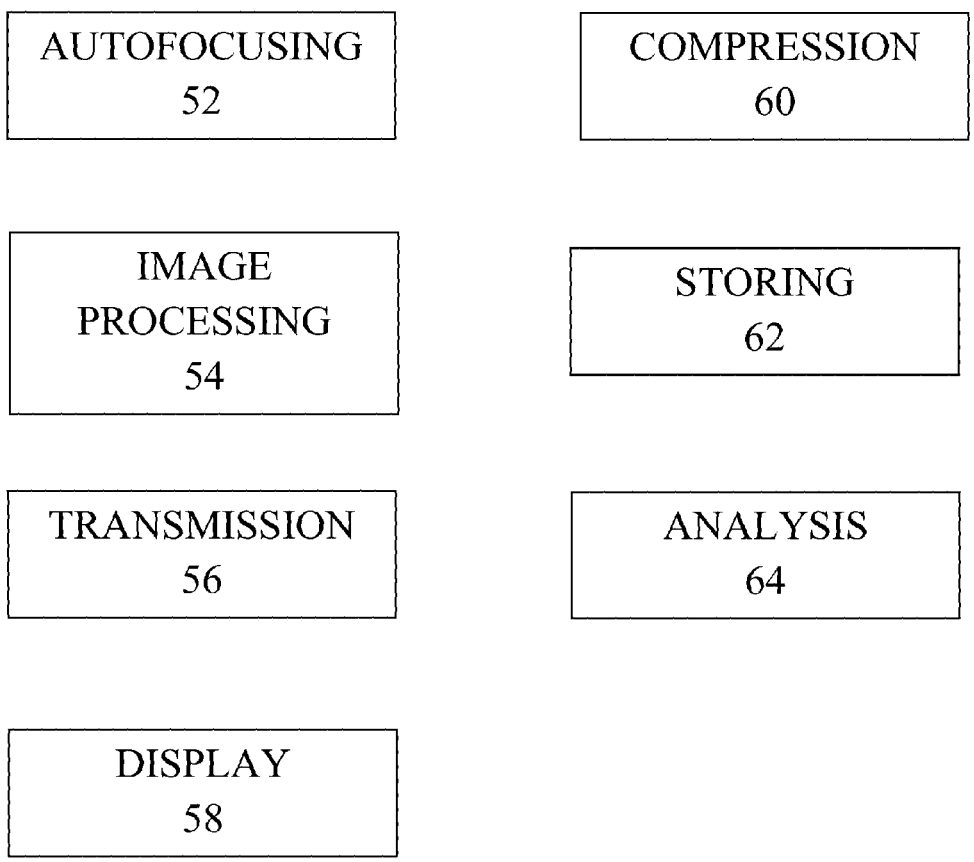
FIG. 7 is a block diagram depicting the functions of the software of the present invention.

Referring now to FIG. 7, the functions of the preferred software product 33 are shown. Software product 33 is stored in memory 32 and is programmed to direct the microprocessor 30, controller 34, and memory 32 to perform the functions necessary to the operation of the inspection probe 10. For example, the software product 33 is used to control the autofocus function 52 of the camera system 44, the processing of images 54 received from the camera system 44, and the transmission 56 of processed image data through the wireless transceiver 28. As described below with reference to FIG. 5, software may also be included to control the display 58 of image data on an integral LCD display, to compress 60 the image, store 62 the image and/or wirelessly transmit the image. Finally, some embodiments of the invention include software that will analyze 64 the image and determine whether the fiber optic end face is clean.

Figure 3:
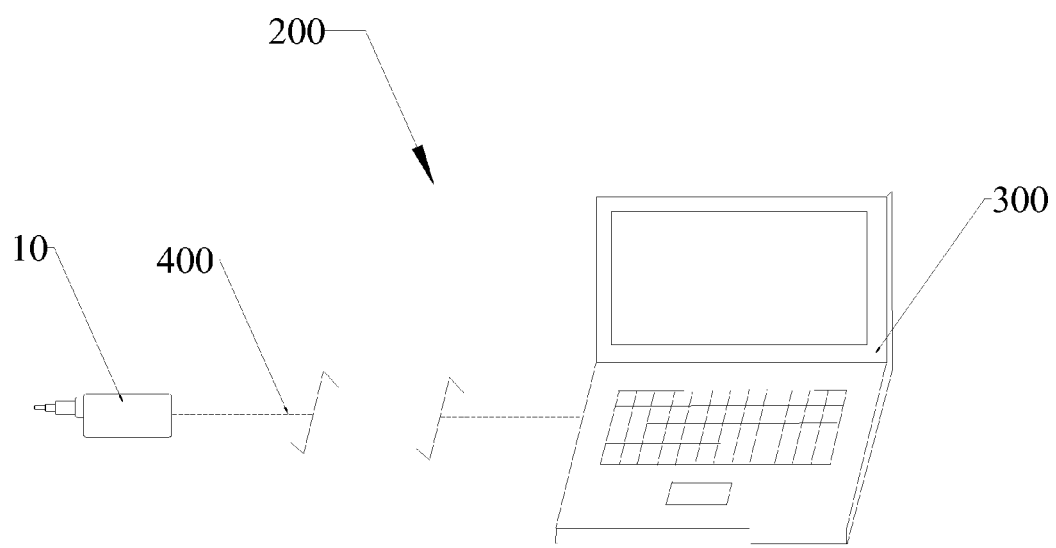
FIG. 3 is a diagrammatic view of one embodiment of the fiber optic end face inspection system of the present invention.

As shown in FIG. 3, in some embodiments the inspection probe 10 is part of an inspection system 200 that includes the inspection probe 10 and an external device 300 that is in wireless communication with the inspection probe 10. External device 300 may be a viewing device, such as those used in conjunction with handheld fiber optic end face inspection probes common in the art of fiber inspection. It may also be an optical time domain reflectometer (OTDR). It may also be a computer having a wireless receiver and, in some preferred embodiments, a wireless transceiver. These latter devices may have larger viewing screens than handheld viewing devices and may have more functionality for analyzing and archiving of the images of a fiber end than a handheld viewing device. In some embodiments, the external device 300 is simply an external storage device, such as external hard drive, that simply stores the images taken by the probe 10. The operator may position the remote external device 300 at a distance 400 from the actual inspection site, thus protecting the remote viewing device 300 from damage inherent in the field, minimizing the equipment the user must bring to an inspection site, and providing the user with a more ergonomic work environment at the inspection site.

Operation of the inspection probe 10 and system 200 is described with reference to FIGS. 4A and 4B. A user 100 will access a panel 110 that includes one or more fiber optic connectors 120. This panel 110 may be located anywhere, but is shown mounted to a utility pole 125 that must be accessed by a ladder 130 in FIGS. 4A and 4B. The user 100 will select and attach a probe adaptor 14 to the inspection probe 10 corresponding to the design of the fiber optic connector 120. The user 100 then inserts the probe adaptor 14 into the fiber optic connector 120 in such a manner as to align the end of the probe adaptor 14 with the fiber optic end face (not shown) to be inspected. This alignment process is important and the ability to hold the inspection probe 10 in the proper position is critical to obtaining an acceptable image, regardless of whether the inspection probe 10 of the present invention or a prior art inspection probe is used. Therefore, the user 100 will look at the inspection probe 10 and fiber optic connector 120 to ensure the proper alignment. Once properly aligned, the user 100 will depress an image control 18 (shown in FIGS. 1, 2A and 2B) to instruct the inspection probe 10 to capture an image. The inspection probe 10 automatically focuses the image, captures the focused image, stores the image in integrated memory. The probe 10 may also wirelessly transmits the image through the integral transmitter to the external device 300 (shown in FIG. 3) if necessary, which may be disposed on the ground below or in a service vehicle (not shown) parked nearby.

In embodiments of the system 200 in which the external device 300 only receives, stores and/or displays images, the user 100 will use the inspection probe 10 to capture and transmit images of each fiber optic end face in a specific order, such as top to bottom or left to right. The user 100 will then review each of the images on the remote viewing device 300, as shown in FIG. 3, to determine whether each fiber optic end face is clean.

In some embodiments of the system 200 in which the external device 300 includes a transmitter and image analysis software, the user 100 will capture an image of a fiber optic end face, the image will be transmitted to the remote viewing device 300 and analyzed by the image analysis software to determine whether the fiber optic end face is clean, the external device 300 will then send a signal to the inspection probe 10 corresponding to whether the fiber optic end face is clean, and the inspection probe 10 will accept this signal and illuminate a light or trigger another alarm to inform the user 100 that the fiber optic end face is either clean or dirty.

Figure 5:
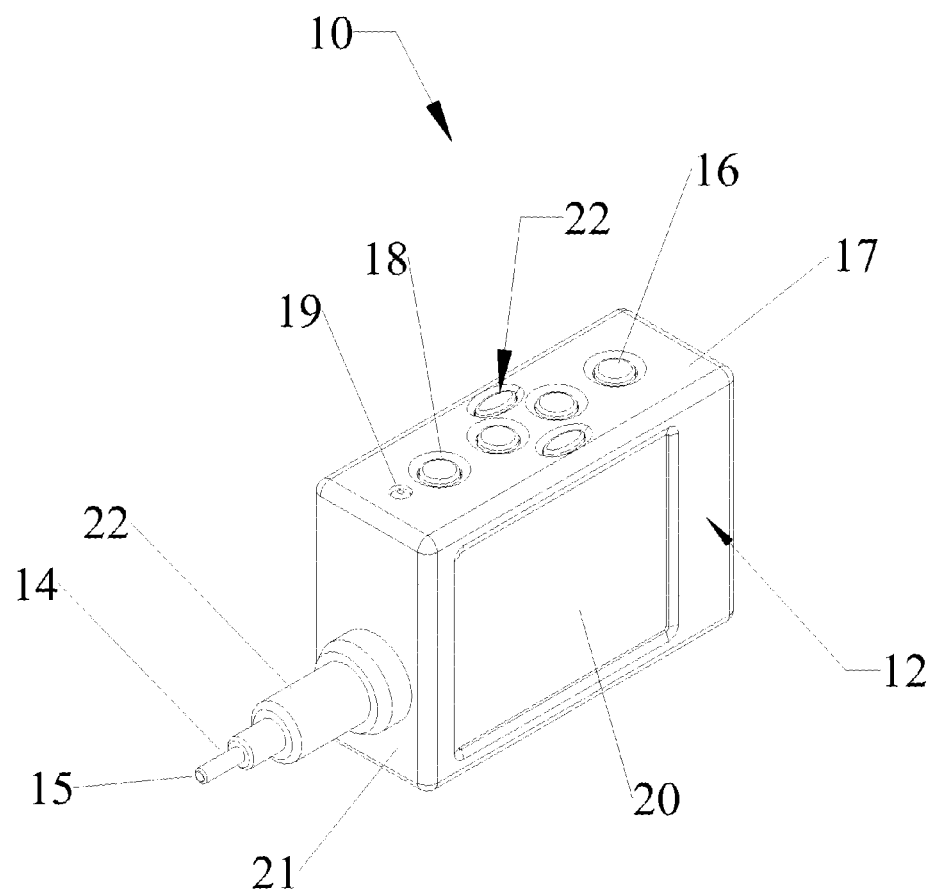
FIG. 5 is an isometric view of an alternative embodiment of the fiber optic end face inspection probe of the present invention that includes an integral display.
Figure 6B:
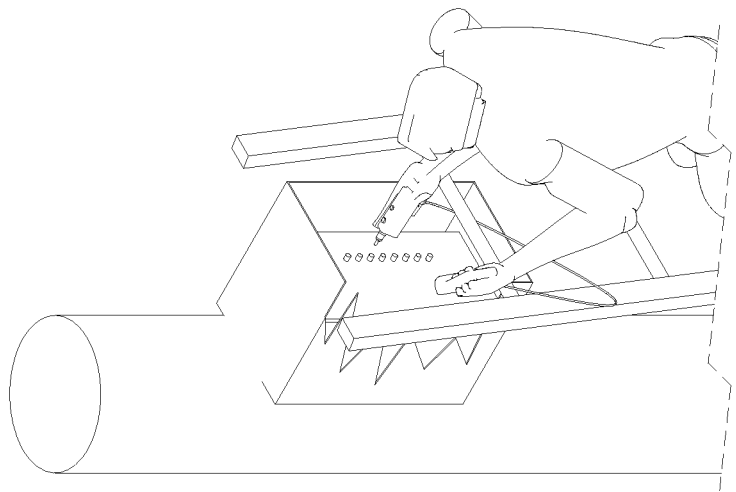
FIGS. 6A and 6B are views of an operator using a prior art fiber optic end face video inspection probe system.
Figure 6A:
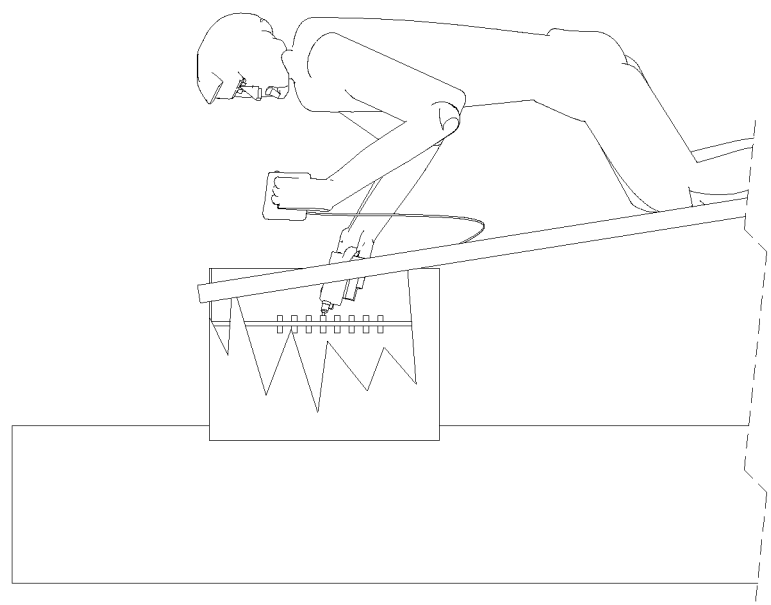

Referring now to FIG. 5, an alternative embodiment of the inspection system 200 is shown. This embodiment omits the external device 300 and integrates the features of the external device 300 and the inspection probe 10 of FIGS. 1, 2A and 2B into a unitary inspection probe 10. The inspection probe 10 includes all of the components of the inspection probe 10 of FIGS. 1, 2A and 2B, but also includes a viewing screen 20, screen controls 22, and software for analyzing captured images. Viewing screen 20 may display the image captured, stored in internal memory and optionally transmitted by the inspection probe 10. Viewing screen 20 may also display pass/fail results of the inspection and may distinguish scratches and contaminations on the fiber optic end face to be inspected. Screen controls 22 control various aspects of the functions of viewing screen 20. Screen controls 22 may include controls for zoom, cut and/or crop, image moving up, down, to the right, or to the left, navigating software menus or others. FIG. 5 depicts the preferred position of the probe adaptor 14 toward the bottom of the inspection probe 10. This positioning allows the user to more easily maneuver the inspection probe through large bunches of cables or wires, when necessary.

As noted above, the inspection probe 10 of FIG. 5 may include software for analyzing the captured images and providing a pass/fail result, or it may only show the image on the viewing screen 20. If it only shows the image on the viewing screen 20, the operator inserts the inspection probe 10 into the connector within which the fiber optic end face to be tested is disposed, presses a button to capture an image, and then removes the inspection probe 10 from the connector and looks at the screen. All may be done by one hand.

If the inspection probe 10 includes image analysis software, the inspection probe 10 of FIG. 5 may omit the wireless transceiver 28. In such embodiments, the inspection probe 10 is a standalone unit that may be inserted into a connector; will automatically focus and capture a focused image of the fiber optic end face disposed within the connector; will analyze the image to determine whether the fiber optic end face of the connector is good or faulty; and will provide the user with an indication of the results of this analysis.

In some embodiments of the inspection probe 10 that include a viewing screen 20, the viewing screen 20 is used to view the image of the fiber optic end face. The image is then sent to an OTDR or other test device, either wirelessly or via a known interface, such as a USB, RS232, RS4, GPIB, Firewire, which stores the image along with other test results captured by the OTDR or other test device.

In some embodiments of the invention that include an integral viewing screen 20 to display the image, the probe 10 also includes means for manually focusing the image that allows the user to override the autofocus in situations where the autofocus does not provide a clear or desired image. The preferred means for manually focusing the image is manual focus software that allows the autofocus software to be overridden and allows the user to use the screen controls 22 on the housing 12 to either cause the motor to move back and forth or to vary the voltage applied to a liquid lens. However, other means, such as focus knobs, motor controls, potentiometers, and the like may also be used. In some embodiments, the autofocus software is eliminated and the camera is a manually focused camera. As noted above, such an embodiment is not preferred due to the advantages inherent in the ability of the probe to automatically focus the image.

Using the inspection probe 10 of the present invention, the user 100 needs to bring the inspection probe 10 itself and nothing further to the inspection site. The user 100 then needs only to turn on the device; place the device in front of the fiber optic end face to be inspected; and press a control button to capture an image of the fiber optic end face. The device does everything else, minimizing the necessity for operator skill. Once the user 100 presses the image control 18 to capture an image, the preferred probe 10 will automatically focus on the fiber optic end face, record the still image, and send the image wirelessly (if required) to whatever viewing device has been chosen. The preferred inspection probe 10 will then automatically turn itself off or go into standby mode. Thus, the only power used is to turn the device on, autofocus, take one picture, process the picture, and send a signal, if required. The process takes no more than a few seconds, after which the inspection probe 10 is turned off or goes into standby mode. This process requires significantly less power than video based inspection systems. Further, it allows the user 100 to concentrate on the alignment of the probe tip 14 with the fiber optic connector 120 and to use his free hand to secure himself to the ladder rather than to hold a separate viewing device.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A fiber optic end face inspection system for inspecting fiber optic end faces, comprising:
    a fiber optic end face inspection probe comprising:
    a camera system comprising: an image sensor; a lens; and a means for focusing an image through said lens;
    an electronics module in electrical communication with said camera system, said electronics module comprising: a controller; a microprocessor; a memory; a wireless transceiver; and a software product stored within said memory and executable by said microprocessor, said software product comprising autofocus software code for controlling said means for focusing an image through said lens;
    a handheld housing, wherein at least said image sensor of said camera system and said electronics module are disposed within said housing;
    a probe end protruding from said housing; and
    a remote viewing device in non-physical communication with said inspection probe, wherein said remote viewing device comprises a wireless transceiver and is adapted to display an image of the fiber optic end face to be inspected;
        a probe adaptor attached to said probe end; a light module disposed proximate to said probe adaptor of said fiber optic end face inspection probe such that said light module may provide light through said probe adaptor, wherein said light module is in electrical communication with said electronics module; and
        a beamsplitter disposed proximate to said light module such that said beamsplitter directs the light from said light module through said probe adaptor.

2. The fiber optic end face inspection system as claimed in claim 1, wherein said software product further comprises image processing software code for processing images received by said electronics module from said camera system.

3. The fiber optic end face inspection system as claimed in claim 2, wherein said software product further comprises analysis software code for analyzing image data to determine a status of a fiber optic end face to be inspected.

4. The fiber optic end face inspection system as claimed in claim 2, wherein said software product further comprises storing software code for storing image data in said memory.

5. The fiber optic end face inspection system as claimed in claim 1 wherein said remote viewing device is chosen from a group consisting of a handheld viewing device, an optical time domain reflectometer, and a personal computer.

6. The fiber optic end face inspection system as claimed in claim 1, further comprising at least one control disposed upon said housing of said fiber optic end face inspection probe, wherein said at least one control is in electrical communication with said electronics module.

7. The fiber optic end face inspection system as claimed in claim 1, further comprising at least one indicator light disposed upon said housing of said fiber optic end face inspection probe, wherein said at least one indicator light is in electrical communication with said electronics module.

8. The fiber optic end face inspection system as claimed in claim 1 wherein said means for focusing an image through said lens comprises said autofocus software and a motor in communication with said lens and adapted to move said lens in order to focus said image.

9. The fiber optic end face inspection system as claimed in claim 1 wherein said lens is a liquid lens comprising a first conductive liquid and a second non-conductive liquid and said means for focusing the image comprises said autofocus software and a variable voltage source that is in electrical communication with said lens and is adapted to the apply a controlled voltage to said first conductive liquid within the lens in order to focus said image.

10. The fiber optic end face inspection system as claimed in claim 1 further comprising means for manually focusing said image.

11. A fiber optic end face inspection system for inspecting fiber optic end faces, comprising a fiber optic end face inspection probe comprising:
a camera system comprising: an image sensor; a lens; and a means for focusing an image through said lens;
an electronics module in electrical communication with said camera system, said electronics module comprising: a controller; a microprocessor; and a memory;
a housing, wherein at least said image sensor of said camera system and said electronics module are disposed within said housing;
a viewing screen disposed upon said housing of said a-fiber optic end face inspection probe and in communication with said microprocessors; and
a probe end protruding from said housing;
  a probe adaptor attached to said probe end; a light module disposed proximate to said probe adaptor of said fiber optic end face inspection probe such that said light module may provide light through said probe adaptor, wherein said light module is in electrical communication with said electronics module; and
  a beamsplitter disposed proximate to said light module such that said beamsplitter directs the light from said light module through said probe adaptor.

12. The fiber optic end face inspection probe as claimed in claim 11, wherein said electronics module of said fiber optic end face inspection probe further comprises a software product stored within said memory and executable by said microprocessor, said software product comprising autofocus software code for controlling said means for focusing an image through said lens.

13. The fiber optic end face inspection probe as claimed in claim 12, wherein said means for focusing an image through said lens comprises said autofocus software and a motor in communication with said lens and adapted to move said lens in order to focus said image.

14. The fiber optic end face inspection probe as claimed in claim 11, wherein said fiber optic end face inspection probe is adapted to analyze image data to determine a status of the fiber optic end face to be inspected and said viewing screen is adapted to display the status.

* * * * *